United States Patent
Kilmer

(10) Patent No.: US 6,578,559 B2
(45) Date of Patent: Jun. 17, 2003

(54) METHANE GAS CONTROL SYSTEM

(75) Inventor: Harry M. Kilmer, Clarksburg, WV (US)

(73) Assignee: Hadoga Industries, Inc., Clarksburg, WV (US)

( * ) Notice: Subject to any disclaimer, the term of this patent is extended or adjusted under 35 U.S.C. 154(b) by 0 days.

(21) Appl. No.: 09/944,914

(22) Filed: Aug. 31, 2001

(65) Prior Publication Data

US 2002/0023628 A1 Feb. 28, 2002

Related U.S. Application Data

(60) Provisional application No. 60/229,059, filed on Aug. 31, 2000.

(51) Int. Cl.[7] ............................................. F02B 43/08
(52) U.S. Cl. ............................................. 123/527; 123/3
(58) Field of Search .......................... 123/3, 527, 575, 123/27 GE

(56) References Cited

U.S. PATENT DOCUMENTS

| | | | |
|---|---|---|---|
| 4,576,005 A | * | 3/1986 | Force ............................ 123/3 |
| 4,750,454 A | * | 6/1988 | Santina et al. ................. 123/3 |
| 5,070,850 A | * | 12/1991 | Davis et al. ................. 123/527 |
| 5,101,799 A | * | 4/1992 | Davis et al. ................. 123/527 |
| 5,501,185 A | * | 3/1996 | King et al. .................. 123/527 |
| 5,724,948 A | * | 3/1998 | King et al. .................. 123/527 |
| 5,775,308 A | * | 7/1998 | Headley ...................... 123/575 |
| 6,205,957 B1 | * | 3/2001 | Saylor ...................... 123/27 GE |
| 6,378,511 B1 | * | 4/2002 | Wolters et al. .............. 123/575 |
| 6,397,790 B1 | * | 6/2002 | Collier, Jr. ..................... 123/3 |

* cited by examiner

Primary Examiner—Tony M. Argenbright
Assistant Examiner—Jason Benton
(74) Attorney, Agent, or Firm—Steptoe & Johnson PLLC

(57) ABSTRACT

A methane gas control system, including a blower having an inlet for generating an air stream and a discharge section for expelling the air stream from the blower, a fuel collector attached to the blower at the discharge section for collecting methane gas contained in the air stream, a heated dryer connected to the fuel collector for eliminating moisture from the methane gas, and an engine connected to the heated dryer that is at least partially fueled by the methane gas. In operation, the methane gas control system removes methane from a borehole by generating and collecting an air stream from the borehole using a blower, collecting methane contained in the air stream using a fuel collector, removing moisture from the methane using a heated dryer, and transporting the methane from the heated dryer to an engine that is at least partially fueled by the methane gas.

20 Claims, 4 Drawing Sheets

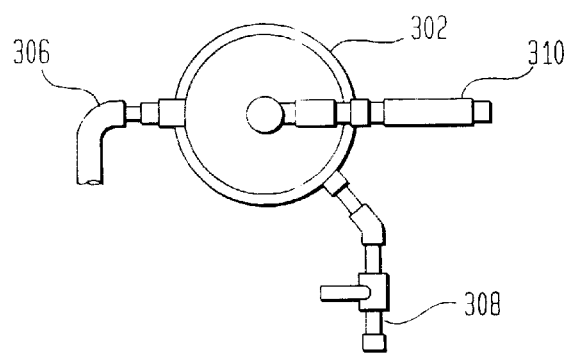
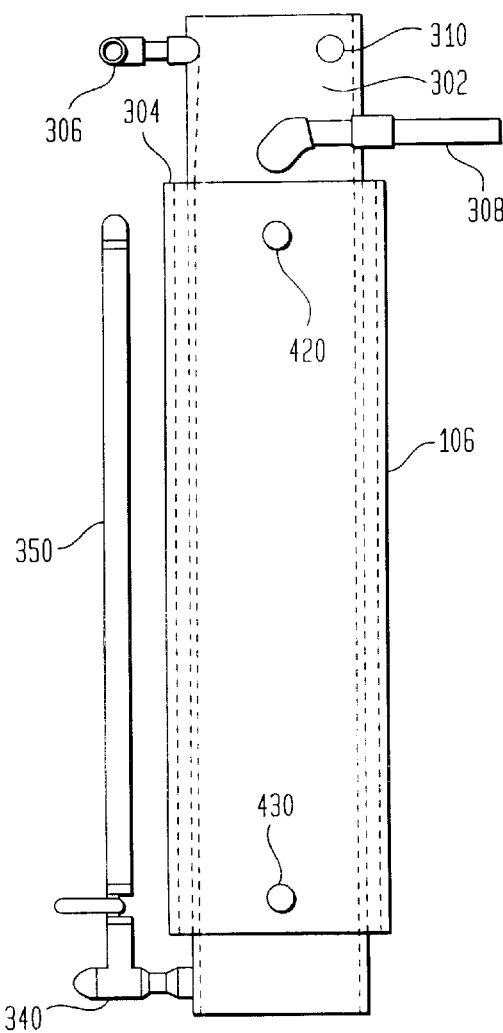
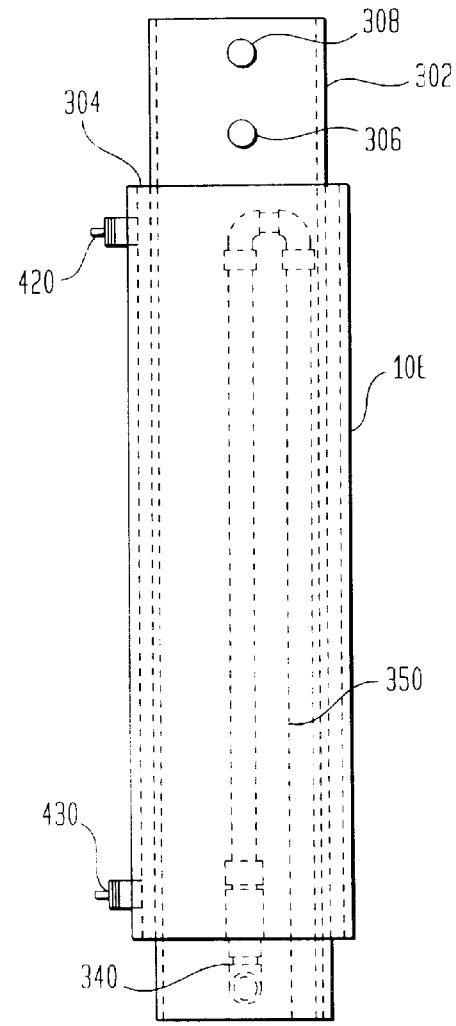

METHANE GAS CONTROL SYSTEM

CROSS-REFERENCE TO RELATED APPLICATIONS

This application claims priority from U.S. provisional application No. 60/229,059 filed Aug. 31, 2000.

BACKGROUND OF THE INVENTION

1. Field of the Invention

This invention relates to methane gas in coal mines, and more particularly to a method and apparatus for eliminating methane gas from boreholes.

2. Related Art

Methane emanates naturally from coal seams and the surrounding geological strata, and is a significant mine safety hazard. Various studies have been conducted to determine how to dispose of this methane gas and whether the methane can be advantageously utilized.

The methane present within the working areas of a coal mine is often removed through the drawing of fresh air into the work areas by large ventilation systems. These systems function to dilute and withdraw the methane gas. In some cases, ventilation alone proves ineffective in controlling methane concentrations in the deepest and most intricate mines such that other means of removing methane become necessary. One method for dealing with this problem is to drill "drainage holes" into a coal seam prior to the actual mining operation. These drainage holes can yield significant quantities of relatively pure methane, sometimes up to 90 percent by volume while reducing the emission rate of methane in the ventilation air.

The concentration of methane in the air stream created by ventilation systems is oftentimes very dilute, and as a result conventional combustion systems are unable to take advantage of this abundant source of energy. Various other means of utilizing this large, but low concentration by volume of methane gas have been considered, but to date, none has been widely adopted. First, spark ignition engines are potentially able to convert the chemical energy in the methane/air mixture to useful energy, but this technology is not well suited for the task due to the inability of such engines to operate with mixtures below the lean limit thus necessitating large quantities of supplemental fuel. A second alternative is to use a gas turbine engine. However, these engines would also require a substantial quantity of supplemental fuel along with the energy required to compress the supplementary fuel to the operating combustion pressure. A final suggested design alternative is the use of regenerative thermal oxidizers; however, such systems have a relatively high pressure drop and generally operate on a reciprocal flow operation, which presents problems associated with the design of how to connect these units to the ventilation fan ducts.

Various attempts have been made in the coal mining industry to modify spark ignition engines to allow them to run on methane gas extracted from borehole air streams. However, these attempts have resulted in systems with engines that are unable to run when the air stream is less than about 65% to about 70% methane. Additionally, because the air stream generated from the boreholes often contains a significant amount of moisture, these systems are also often inoperable in cold weather conditions because the moisture in the air stream freezes. Therefore, a need exists to design a methane gas control system having an engine that continues to run when there is only a low quality methane source available. There is a further need for a system that is sufficiently rugged to function during inclimate weather, especially freezing conditions.

SUMMARY OF THE INVENTION

The present invention solves the problems encountered with previous methods of regulating methane gas by providing a methane gas control system with a methane-fueled engine that is capable of running when the air stream is as little as 30% methane. The invention further provides a methane gas control system that is operational in all weather conditions, including freezing weather.

One aspect of the invention is a methane gas control system for eliminating methane gas from a source, including a blower having an inlet for generating an air stream from the source and a discharge section for expelling the air stream from the blower, a fuel collector attached to the discharge section of the blower for collecting methane gas contained in the air stream, a heated dryer connected to the fuel collector for eliminating moisture from the methane gas, and an engine connected to the heated dryer that is at least partially fueled by the methane gas.

Another aspect of the invention is a method of removing methane from a source, including the steps of (a) generating and collecting an air stream containing methane gas from the source with a blower; (b) collecting the methane gas contained in the air stream in a fuel collector; (c) removing moisture from the methane gas with a heated dryer; and (d) transporting the methane gas from the heated dryer to an engine that is at least partially fueled by the methane gas.

Another aspect of the invention is a method of maintaining a desired air to fuel ratio in a spark ignition engine fueled at least partially by methane gas, including the steps of (a) regulating methane gas flow through a primary methane fuel line and into the engine with a methane control valve; and (b) regulating atmospheric air flow into the engine by closing a special choke mounted on the engine carburetor.

A feature of the invention is a heated dryer that removes moisture from methane gas contained in an air stream collected from a source.

Another feature of the invention is that the heated dryer remains at a steady temperature thereby preventing freezing of the methane gas.

Another feature of the invention is a methane control valve for regulating the amount of methane gas metered to the engine.

Another feature of the invention is a special choke for regulating the atmospheric air to the engine.

Another feature of the invention is an LP gas system that enables the methane gas control system to remain operational when methane gas is present in very low concentrations, or when the methane gas that is present is of very poor quality.

Another feature of the invention is the simultaneous regulation of atmospheric air and methane gas to the engine.

An advantage of the invention is that the heated dryer collects moisture from the air stream containing the methane gas and expels the collected moisture automatically.

Another advantage of the invention is that the engine is capable of running on at least about 300 BTU methane gas.

Another advantage of the invention is that the methane gas control system remains highly operational while requiring minimal maintenance.

Another advantage of the invention is the improved ability to regulate air to fuel ratio due to a methane control valve for regulating methane flow to the engine, a special choke for regulating the flow of atmospheric air to the engine, and a secondary methane fuel line that bypasses the special choke for adding a mixture of air and methane gas to air/fuel mixture.

BRIEF DESCRIPTION OF THE DRAWINGS

The present invention is described with reference to the accompanying drawings. In the drawings, like reference numbers indicate identical or functionally similar elements.

FIG. 2 depicts the fuel collector;

FIG. 3 depicts the heated dryer;

FIG. 3A is a planar top view of the inner section of the heated dryer including the primary methane fuel line, the secondary methane fuel line, and the fuel collector line;

FIG. 3B is a planar side view of the heated dryer including the vertical column;

FIG. 3C is a planar front view of the heated dryer;

DETAILED DESCRIPTION OF THE PREFERRED EMBODIMENTS

Figure 1:
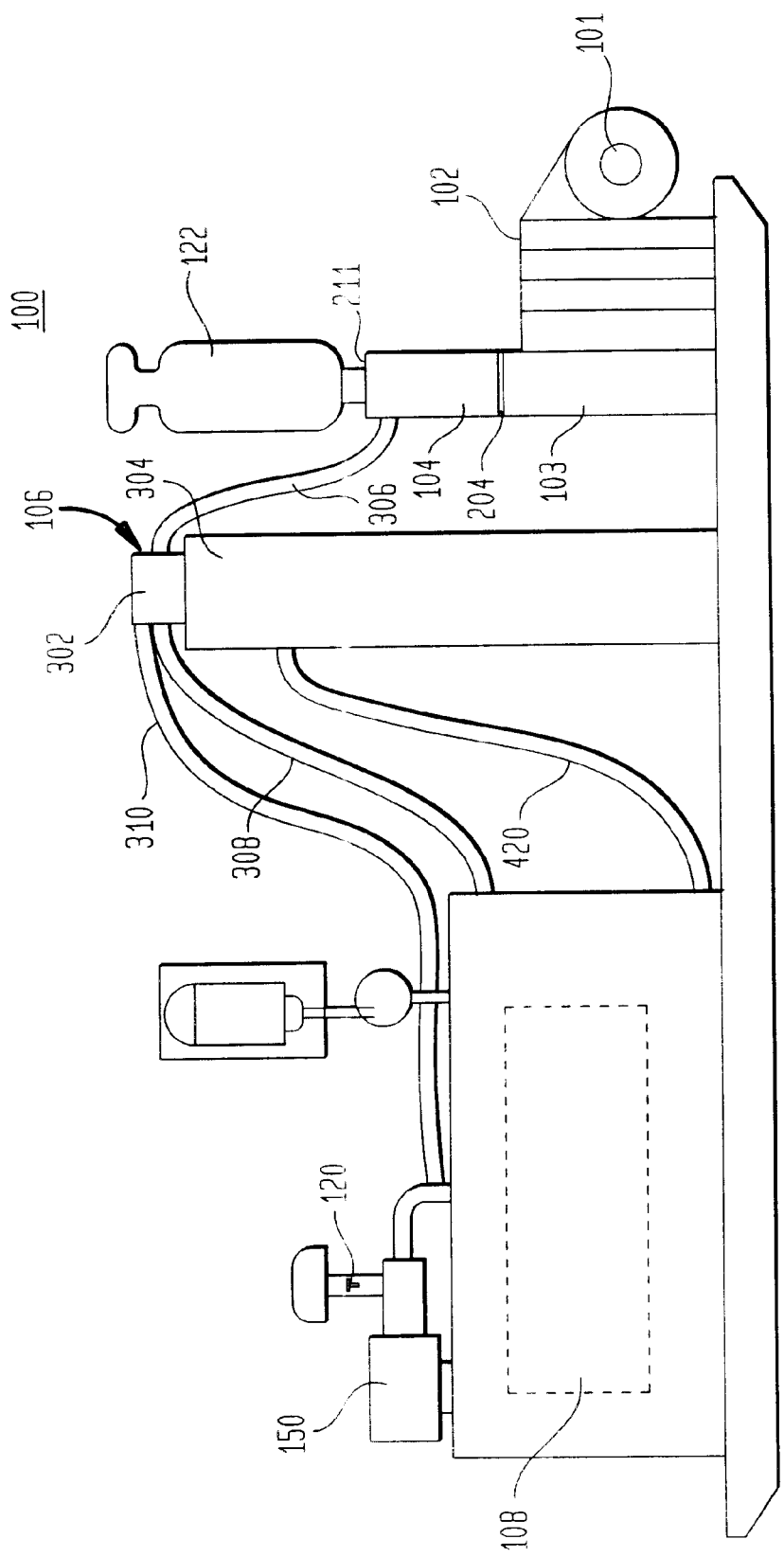
FIG. 1 is a planar back view of the heated dryer and engine of the methane control system.
Figure 2A:
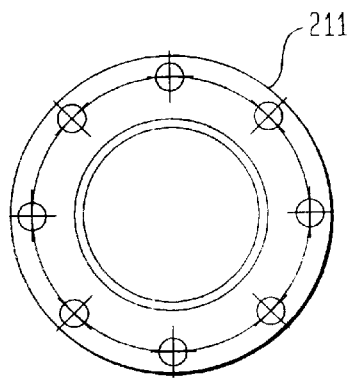
FIG. 2A is a planar top view of the second screw on flange.
Figure 2B:
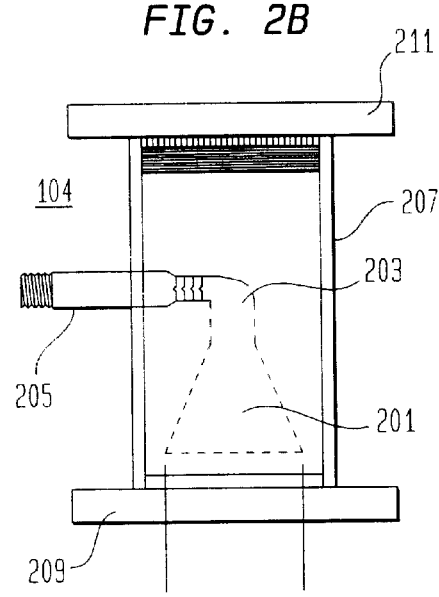
FIG. 2B is a planar side view of the fuel collector including the conical funnel, elbow, and discharge pipe.
Figure 2C:
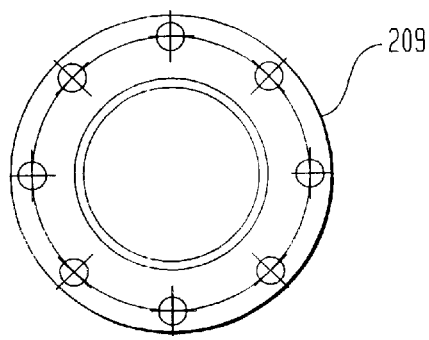
FIG. 2C is a planar bottom view of the first weld on flange.
Figure 2D:
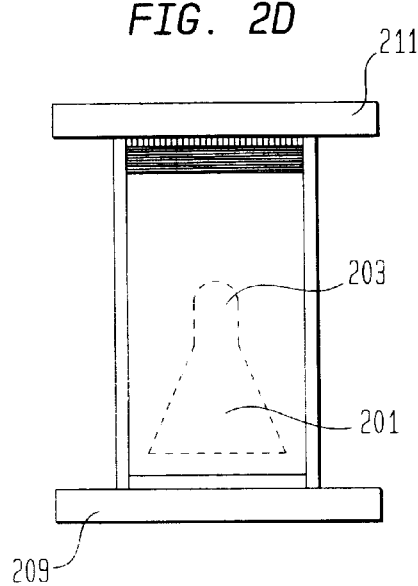
FIG. 2D is a planar front view the fuel collector including the conical funnel, elbow, and discharge pipe.
Figure 4:
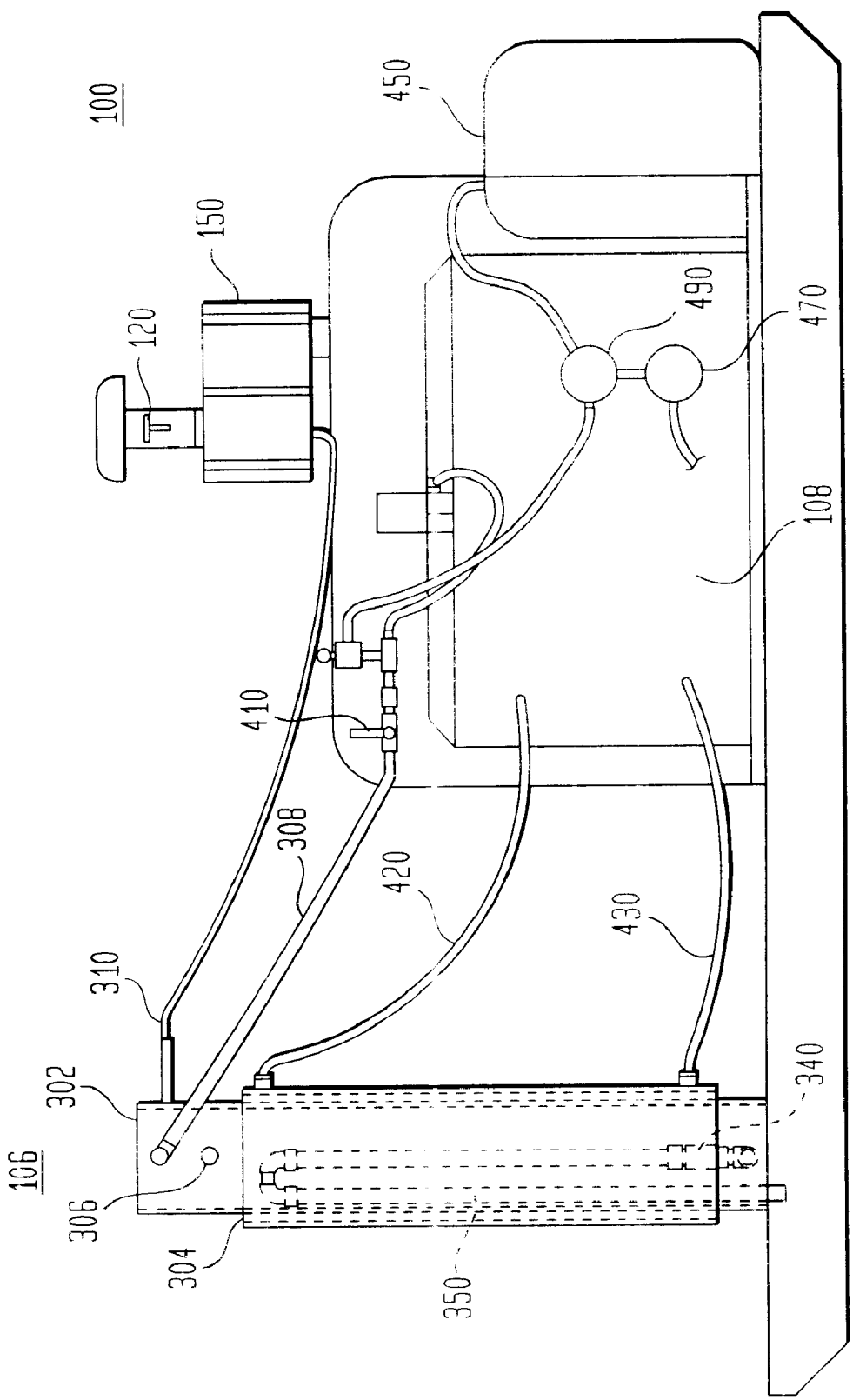
FIG. 4 is a planar front view of the blower, fuel collector, heated dryer, and engine of the methane control system.

FIG. 1 depicts the methane gas control system 100 of the present invention. The methane gas control system 100 functions to remove methane gas from the air, especially from boreholes in coal mines, and to regulate the air to fuel ratio of the air stream metered to a spark ignition engine. The methane control system 100 comprises a blower 102, a fuel collector 104, a heated dryer 106, and an engine 108. The present invention is described in relation to removing methane from coal mines for convenience purposes only. It would be readily apparent to one having ordinary skill in the art to use this invention in alternative applications where methane gas is present at a source, for example, at dump sites. Therefore, these alternative uses are intended to be within the scope of the present invention.

A. Apparatus

Blower

The blower 102 is placed in proximity of a borehole and generates an air stream containing methane gas from the borehole. The blower 102 comprises an inlet 101 for collecting gas from the air stream, and a discharge section 103 for expelling the air stream from the blower 102. The blower 102 may be a commercially available single stage blower, but is preferably a commercially available multi-stage blower. In a preferred embodiment, the blower 102 is a commercially available nine stage 1530 cubic foot per minute (CFM) blower that is run at about 3,550 RPM and capable of about 15 inches of mercury vacuum at the inlet 101.

Fuel Collector

A fuel collector 104 is mounted to the discharge section 103 of the blower 102 such that the air stream being expelled from the discharge section 103 passes through the fuel collector 104. The fuel collector 104 collects the gas, including the methane, contained in the air stream generated by the blower 102. The fuel collector 104 is preferably made from a standard twelve inch pipe 207 that is nipple sized to fit the plumbing and displacement of the blower 102. In a preferred embodiment, the twelve inch pipe 207 has a first weld on flange 209 for connecting the fuel collector 104 to the discharge unit, and a second screw on flange 211 for enclosing the interior of the fuel collector 104. The fuel collector 104 optionally, and preferably, includes a muffler 120 mounted on top of the second screw on flange 211 to reduce the amount of noise generated by operating the methane gas control system 100.

The fuel collector 104 internally houses a conical funnel 201 connected to a discharge pipe 205 by an elbow 203. The conical funnel 201, elbow 203, and discharge pipe 205 are preferably made of stainless steel, but can alternatively be made of other materials known to one of ordinary skill in the art. The conical funnel 201 is positioned near the bottom of the fuel collector 104 such that the opening of the conical funnel 201 faces the first weld on flange 209. The first weld on flange 209 has an opening corresponding to the width of the conical funnel 201 to allow the passage of the air stream from the discharge unit 103 of the blower 102 into the conical funnel 201. The conical funnel 201 preferably has an opening of about 4.5 inches. The discharge pipe 205 extends horizontally through the side wall of the twelve inch pipe 207. The discharge pipe 205 preferably is about 5 to 5.5 inches long and has a diameter of about 1 inch.

Heated Dryer

The heated dryer 106 collects and eliminates moisture from the air stream containing the methane gas and forwards the "dry" methane gas to the engine 108. Ideally, the air stream extracted from a borehole contains concentrated methane gas that is very pure, however that is rarely the case as the air stream often contains dilute methane gas along with various contaminants. The heated dryer 106, therefore serves as a mechanism to purify the methane gas in the air stream and improve the quality of the methane gas presented to the engine 108.

The heated dryer 106 comprises an inner section 302 and a jacket 304 that surrounds the inner section 302. The inner section 302 is designed to receive the air stream containing the methane gas from the fuel collector 104. The inner section 302 includes a freely moving baffle known to those of ordinary skill in the art, that directs the air stream downward. The interior of the inner section 302 is accessed by three lines: a fuel collector line 306, a primary methane fuel line 308, and a secondary methane fuel line 310. The fuel collector line 306 is connected to the discharge pipe 205 of the fuel collector 104, and is preferably a flexible hose, but can alternatively be any other connecting means known to one of ordinary skill in the art, such as stainless steel pipe. The primary methane fuel line 308 includes a methane control valve 410 for regulating the flow of methane gas from the fuel collector 106 to the engine 108. The secondary methane fuel line 310 bypasses the special choke 120 and introduces methane directly into the air cleaner 150.

The inner section 302 further includes a means for eliminating moisture that is collected from the air stream containing the methane gas. The means for eliminating moisture comprises a valve 340 at the bottom of the inner section 302 that is open to the atmosphere, and a vertical column 350. The vertical column 350 is calibrated to match the blower 102 pressure exerted on the interior of the inner section 302, and also provides an hydraulic seal to the atmosphere due to the height of the vertical column 350.

The jacket 304 of the heated dryer 106 keeps the inner section 302 at a stable temperature. The jacket 304 receives at least one, and preferably two, coolant lines from the engine 108. The first coolant line 420 is preferably connected near the top of the jacket 304 and the second coolant line 430 is preferably connected near the bottom of the jacket 304. The jacket 304 contains interior plumbing that, while being inside the jacket 304, is outside the inner section 302. The interior plumbing is in communication with the first and second coolant lines 420, 430 such that engine coolant can be piped in to the jacket 304 from the engine 108 thereby maintaining the jacket 304 at engine coolant temperature. As a result, the jacket 304 remains at a stable temperature and functions to prevent the gas within the inner section 302 of the heated dryer 106 from freezing thereby allowing the methane gas control system 100 to be effectively utilized in freezing weather.

Engine

The engine 108 of the methane gas control system 100 is connected to the heated dryer 106, and is at least partially fueled by methane gas. The engine 108 is preferably a spark ignition engine having a standard carburetor with a venturi attached. The engine 108 includes an air cleaner 150 for cleaning atmospheric air before it enters the carburetor, and a special choke 120 mounted in the atmospheric air stream between an air inlet bonnet and the air cleaner 150. The special choke 120 is manually adjusted by one of ordinary skill in the art by opening or closing a butterfly valve that is locked in place with a thumb screw on a quadrant to regulate the atmospheric air flow into the engine according to the The engine 108 is fed by two fuel lines: the primary methane fuel line 308 and the secondary methane fuel line 310. The primary methane fuel line 308 transports methane gas from the inner section 302 of the heated dryer 106 through a methane control valve 410 and to the venturi on the carburetor. The air to fuel ratio of the methane gas from the primary methane fuel line 308 is regulated by the special choke 120. The special choke 120 is opened to allow atmospheric air to mix with concentrated methane gas, and is closed to prevent the mixing of atmospheric air with diluted methane gas. Unlike the primary methane fuel line 308 that is regulated by the methane control valve 410 and the special choke 120, the secondary methane fuel line 310 bypasses the special choke 120 and is connected directly to the air cleaner 150. This allows an additional means for an operator to regulate the air to fuel ratio of the methane gas entering into the engine 108.

The methane gas control system 100 further comprises a liquid petroleum (LP) gas system 450 that allows the engine 108 to function as in any conventional LP gas application. The engine 108 further includes an LP gas fuel regulator 470 for metering LP gas into the methane gas stream, and an LP gas separator 490. Engine 108 speed can be varied with use of a throttle control, and engine 108 speed and blower 102 output are directly proportional.

B. Method of Use

Efficient utilization of methane gas extracted from coal mines is often hindered due to the impure nature and relatively low quality of the methane recovered. For example, many of the previous systems designed to eliminate and run on methane gas require the air stream to contain about 65% to about 70% methane, while the air streams flowing from boreholes often contain as little as 30% methane. Pure methane, as well as natural gas, is about a 1,000 BTU fuel, however much of the methane extracted from boreholes ranges from about 300-700 BTUs. The methane gas control system 100 of the present invention is useful because the engine 108 will continue to run with 300 BTU methane, whereas previous systems required 600-700 BTU per cubic foot methane.

In operation, the blower 102 is placed in proximity to a borehole and generates a stream of air from the borehole. The inlet 101 of the blower 102 collects the gaseous air stream and forces it out through the blower discharge section 103. The air stream is forced out of the discharge section 103 and into a fuel collector 104 mounted on top of the discharge section 103 and in the path of the air stream. The air stream enters the fuel collector 104 through a first welded flange 209 having an opening corresponding in size to the diameter of the opening in the conical funnel 201 contained within the fuel collector 104. The air stream is collected by the conical funnel 201 and is forced through an elbow 203 and into a discharge pipe 205 that extends horizontally through a vertical wall of the fuel collector 104.

The discharge pipe 205 of the fuel collector 104 is connected to the heated dryer 106 by a fuel collector line 306. The air stream is forced by the blower 102 pressure through the fuel collector line 306 and into the inner section 302 of the heated dryer 106. As the air stream enters the inner section 302 of the heated dryer 106, a baffle directs the air stream downward. Moist air containing heavier water molecules precipitates to the bottom of the inner section 302, while lighter methane gas remains at the top of the inner section 302. Moisture, i.e., water, accumulating in the bottom of the inner section 302 is expelled through an opening near (about 2 inches from) the bottom of the inner section 302. This phenomenon occurs in part because of the pressure exerted on the interior of the inner section 302 by the blower 102. A vertical column 350 is calibrated according to the blower 102 pressure, and the result is an hydraulic seal that draws the moisture out of the bottom of the inner section 302 and through the vertical column 350 to the atmosphere through a valve 340. In a preferred embodiment, the blower 102 exerts about 1 psi of pressure on the interior of the inner section 302, therefore the vertical column 350 is calibrated for about 28 inches of water. As the accumulated moisture reaches the height of the opening in the bottom of the inner section 302, the blower 102 pressure forces the water into the opening and a hydraulic seal is formed. With proper calibration, the water will be automatically drawn through the vertical column 350 and out of the inner section 302 into the atmosphere. As a result, the methane gas control system 100 automatically removes and eliminates moisture from the methane gas contained in the air stream.

While the collected moisture is eliminated through the bottom of the inner section 302, the lighter methane gas remains at the top of the inner section 302 of the heated dryer 106. The methane gas is extracted from the heated dryer 106 by a primary methane fuel line 308 attached near the top of the inner section 302. The primary methane fuel line 308 runs from the top of the inner section 302 of the heated dryer 106 to a venturi mounted on the engine 108 carburetor. The flow of methane through the primary methane fuel line 308 is regulated by a methane control valve 410. The venturi ensures constant flow of methane gas into the carburetor.

The engine 108 includes a special choke 120 that restricts atmospheric air flow into the engine 108. For example, when high quality, i.e., concentrated, methane is being run through the methane gas control system 100, the special choke 120 is placed in the open position thereby allowing the free flow of atmospheric air into the carburetor of the engine 108. On the other hand, when low quality, i.e. diluted, methane is being run through the methane gas control system 100, the special choke 120 is placed in a closed position thereby reducing the amount of atmospheric air that mixes with the methane in the carburetor. The special choke 120 is useful because it is used in conjunction with the methane control valve 410 to establish the proper air to fuel ratio (10-15 parts air to 1 part fuel) thereby allowing the engine 108 to run on low quality methane.

In addition to the primary methane fuel line 308, there is also a secondary methane fuel line 310 that runs from the heated dryer 106. The secondary methane fuel line 310 bypasses the special choke 120 and is connected directly to the carburetor via the air cleaner 130. As a result, the secondary methane fuel line 310 functions as yet another mechanism to regulate the air to fuel ratio. For example, when low quality methane, i.e., high oxygen content, is present, the special choke 120 is placed in a closed position to prevent additional atmospheric air from mixing with the dilute methane gas. However, in the event that closing the special choke 120 reduces the air content too much, the secondary methane fuel line 310 can be opened thereby introducing additional methane gas and oxygen to the air-fuel mixture.

The methane gas control system 100 also includes a liquid petroleum (LP) system 450 that is piped into the engine 108. In the absence of methane, the LP system 450 can be used as in any conventional LP gas application to run the engine 108. Additionally, LP gas can be metered into the methane gas stream using the second stage fuel regulator 470 mounted on the engine.

The methane gas control system 100 of the present invention is useful because it can be used to regulate atmospheric methane in virtually all conditions. The heated dryer 106 allows the methane gas control system 100 to remain operational in freezing weather by eliminating moisture and warming the methane, thereby preventing the fuel from freezing. The engine 108 remains operational regardless of the quality of methane available due to the mechanisms built in to the methane gas control system 100 for regulating the air to fuel ratio. For example, the methane gas control system 100 includes a methane control valve 410 on the primary methane fuel line 308 for regulating the flow of methane to the engine 108, a special choke 120 for restricting atmospheric air flow to the engine 108, and a secondary methane fuel line 310 that bypasses the special choke 120. Examples of how these mechanisms are used in various conditions are further explained below.

Methane Gas is not Available

When methane gas is not available, the LP system 122 can be used and the engine 108 run as in any conventional LP gas application. Additionally, the engine 108 can be started using the LP system 122 and an operator can then engage the blower 102 thereby generating a stream of air in an effort to gather methane gas from a borehole air stream.

High Quality Methane (Above 700 BTU) Is Available

When high quality methane is available, the methane gas is collected in the fuel collector 104 that is attached to the discharge section 103 of the blower 102. The pressure from the blower 102 forces the methane gas into the heated dryer 106 that is kept at a stable temperature due to engine coolant being piped through the jacket 304 that surrounds the inner section 302 of the heated dryer 106. This is especially helpful in freezing weather conditions when the moisture laden air stream would otherwise freeze. The dry methane gas is then passed through the primary methane fuel line 308, the methane control valve 410, and the venturi mounted on the engine 108 carburetor. The special choke 120 is placed in the open position to permit the mixing of atmospheric air with the high quality (concentrated) methane gas.

Low Quality Methane (Below 700 BTU) Is Available

When the quality of the methane gas is below 700 BTU per cubic foot, the methane gas control system 100 remains operational. The desired air to fuel ratio is established by regulating the flow of methane gas from the heated dryer 106 through the primary methane fuel line 308 using the methane control valve 410; restricting atmospheric air flow into the engine by closing the special choke 120; and/or adding methane and air to the mixture by opening the secondary methane fuel line 310 that bypasses the special choke 120. Using these methods, the engine 108 is capable of running with as low as 300 BTU per cubic foot methane gas in a satisfactory manner.

CONCLUSION

While various embodiments of the present invention have been described above, it should be under-stood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A methane gas control system for eliminating methane gas from a source, comprising:
   a blower having an inlet for generating an air stream from the source and a discharge section for expelling the air stream from said blower;
   a fuel collector attached to said discharge section of said blower for collecting methane gas contained in the air stream;
   a heated dryer connected to said fuel collector for eliminating moisture from the methane gas;
   an engine connected to said heated dryer, said engine being at least partially fueled by the methane gas; and
   a means for regulating atmospheric air flow to said engine.

2. The methane gas control system according to claim 1, wherein said means for regulating atmospheric air flow to said engine is a special choke.

3. The methane gas control system according to claim 1, further comprising a liquid petroleum (LP) gas system piped in to said engine.

4. The methane gas control system according to claim 3, further comprising a special choke for regulating atmospheric air flow to said engine.

5. The methane gas control system according to claim 1, wherein said fuel collector comprises a conical funnel, an elbow, and a discharge pipe.

6. The methane gas control system according to claim 5, wherein said conical funnel, said elbow, and said discharge pipe are made of stainless steel.

7. The methane gas control system according to claim 6, wherein said discharge pipe is connected to said heated dryer by a fuel collector line.

8. The methane gas control system according to claim 1, wherein said heated dryer comprises an inner section for receiving methane gas and a jacket surrounding said inner section.

9. The methane gas control system according to claim 8, wherein said heated dryer further comprises a coolant line connecting said jacket to said engine.

10. The methane gas control system according to claim 9, wherein engine coolant passes from said engine to said jacket through said coolant line, thereby maintaining said inner section at engine coolant temperature.

11. The methane gas control system according to claim 3, wherein said heated dryer has an inner section having a baffle that directs the methane gas received from said fuel collector downward through said inner section.

12. The methane gas control system according to claim 1, wherein said heated dryer further comprises a vertical column for discharging moisture collected in said inner section.

13. The methane gas control system according to claim 2, wherein said heated dryer is connected to said engine by a primary methane fuel line.

14. The methane gas control system according to claim 13, wherein methane gas is forced through said primary methane fuel line into said special choke mounted to said engine.

15. The methane gas control system according to claim 13, wherein said primary methane fuel line further comprises a methane control valve for controlling methane flow to said engine.

16. The methane gas control system according to claim 2, wherein said heated dryer is further connected to said engine by a secondary methane fuel line.

17. The methane gas control system according to claim 16, wherein said secondary methane fuel line bypasses said special choke.

18. A method for removing methane from a borehole, comprising the steps of:
   a. generating and collecting an air stream containing methane gas from the borehole with a blower having an inlet for generating the air stream from the borehole and a discharge section for expelling the air stream from said blower;
   b. collecting the methane gas contained in the air stream in a fuel collector attached to said discharge section of said blower;
   c. removing moisture from the methane gas with a heated dryer connected to said fuel collector;
   d. transporting the methane gas from said heated dryer to an engine via a primary methane fuel line, said engine being at least partially fueled by the methane gas; and
   e. regulating atmospheric air flow to said engine with a special choke.

19. The method for removing methane from a borehole according to claim 18, wherein the methane gas is further transported from said heated dryer by a secondary methane fuel line.

20. The method for removing methane from a borehole according to claim 19, wherein said secondary methane fuel line bypasses said special choke.

* * * * *